United States Patent
Sahlqvist (10) Patent No.: US 10,355,976 B2
(45) Date of Patent: Jul. 16, 2019

(54) METHODS, NODES AND SYSTEM FOR ESTABLISHING INDEPENDENT NETWORK PATHS

(71) Applicant: ABB Schweiz AG, Baden (CH)

(72) Inventor: Per Sahlqvist, Västerås (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 15/768,804

(22) PCT Filed: Oct. 26, 2015

(86) PCT No.: PCT/EP2015/074733
§ 371 (c)(1),
(2) Date: Apr. 16, 2018

(87) PCT Pub. No.: WO2017/071729
PCT Pub. Date: May 4, 2017

(65) Prior Publication Data
US 2019/0149451 A1    May 16, 2019

(51) Int. Cl.
*H04L 12/735* (2013.01)
*H04L 12/707* (2013.01)
*H04L 12/741* (2013.01)
*H04L 12/775* (2013.01)

(52) U.S. Cl.
CPC ............ *H04L 45/128* (2013.01); *H04L 45/22* (2013.01); *H04L 45/24* (2013.01); *H04L 45/58* (2013.01); *H04L 45/745* (2013.01)

(58) Field of Classification Search
None
See application file for complete search history.

(56) References Cited

U.S. PATENT DOCUMENTS 6,751,191 B1 * 6/2004 Kanekar ............ H04L 12/4641
                                                              370/217
6,868,509 B2    3/2005 Gale et al.
(Continued)

FOREIGN PATENT DOCUMENTS

EP    1458147 A1    9/2004
WO    2013030276 A1    3/2013

OTHER PUBLICATIONS

Rentschler et al. "The Parallel Redundancy Protocol for Industrial IP Networks", 2013 IEEE International Conference on Industrial Technology, Feb. 25-28, 2013. (Year: 2013).*
Clemens Hoga: "Seamless communication redundancy of IEC 62439", Advanced Power System Automation and Protection (APAP), 2811 International Conference on, IEEE, Oct. 16, 2811 (2811-18-16), pp. 489-494.
(Continued)

*Primary Examiner* — Joseph A Bednash
(74) *Attorney, Agent, or Firm* — Whitmyer IP Group LLC (57) ABSTRACT

A method in a source node establishing independent network paths including a first and second router nodes connected to the source node over a first and second mutually independent networks. The source node includes a first interface towards the first network, associated with a path identifier for a first network path; a second interface towards a second network associated with a path identifier for a second network path, and is configured to select which of the first and second router nodes should be used for sending data from the source node to the destination node via the first and second network paths, wherein the source node is configured to select different router nodes for the first and second network paths.

24 Claims, 3 Drawing Sheets

(56) References Cited

U.S. PATENT DOCUMENTS

| | | | |
|---|---|---|---|
| 7,343,360 B1* | 3/2008 | Ristanovic | G06Q 30/08 |
| | | | 705/412 |
| 7,590,756 B2 | 9/2009 | Chan | |
| 2005/0094554 A1* | 5/2005 | Nakash | H04L 12/437 |
| | | | 370/222 |
| 2006/0039385 A1 | 2/2006 | Bare et al. | |
| 2006/0067330 A1 | 3/2006 | Schollmeier et al. | |
| 2006/0087962 A1* | 4/2006 | Golia | H04L 29/12009 |
| | | | 370/216 |
| 2006/0256768 A1 | 11/2006 | Chan | |
| 2008/0192625 A1 | 8/2008 | Aono | |
| 2014/0233373 A1* | 8/2014 | O'Connor | H04L 41/0663 |
| | | | 370/228 |
| 2016/0065458 A1* | 3/2016 | Ye | H04L 12/462 |
| | | | 370/410 |

OTHER PUBLICATIONS

International Preliminary Report on Patentability Application No. PCT/EP2015/074733 dated Jan. 17, 2018; Completed: Jan. 17, 2018 6 pages.
International Search Report and Written Opinion of the International Searching Authority Application No. PCT/EP2015/074733 dated Sep. 28, 2016; Completed: Sep. 19, 2016 14 pages.
Written Opinion of the Inernational Preliminary Examining Authority Application No. PCT/EP2015/074733 dated Oct. 31, 2017 9 pages.
Written Opinion of the Inernational Preliminary Examining Authority Application No. PCT/EP2015/074733 dated Sep. 18, 2017 6 pages.

* cited by examiner

METHODS, NODES AND SYSTEM FOR ESTABLISHING INDEPENDENT NETWORK PATHS

TECHNICAL FIELD

The technology disclosed herein relates generally to the field of communication systems, and in particular to methods, nodes and system for establishing independent network paths in a communication system.

BACKGROUND

Real time automation systems are sensitive to loss of data. Data can be lost in such systems for several reasons, for instance due to errors on links or network devices, external electrical disturbances, radio disturbances or resource problems in network devices. Any such failure within a real-time control system supervising, for instance, an electrical system, may lead to severe consequences.

In order to reduce the risk of communication losses redundancy may be added. In a layer-2 Ethernet network with ring topology all devices are connected by two ports to the Ethernet network. A media redundancy protocol manages reconfiguration if a link is broken. A drawback with this method is that reconfiguration after failure takes time and any lost data has to be retransmitted, which entails delay. Another problem is that a ring is logically a single Ethernet network with little protection against disturbances such as intermittent link errors or broadcast storms.

Another Layer-2 method uses a parallel Ethernet structure as defined in the International Electrotechnical Commission (IEC) 62439-3 (Parallel Redundancy Protocol, PRP). A PRP network implements redundancy functions in the communicating end nodes, which are each attached to two different and completely separated Ethernet networks; the two Ethernets have no direct connection. As long as one of the Ethernet networks is operational the frame sent from a source node reaches the destination node, which receives only the first message and discards the duplicate message. Hence, no data is lost even if one of the networks would fail and the PRP is a good option for use within an Internet Protocol (IP) subnetwork such as Ethernet.

US2006/0256768 describes a routing method in a communication network minimizing overlap between two paths in the network over which an original packet and its duplicate are sent.

Although PRP provides high reliability, it is limited to work only within the IP subnetwork. The mentioned real-time automation systems may comprise applications which are highly sensitive to loss of data also from devices of remote networks and even a shorter disturbance in the remaining functioning IP subnetwork may then have critical effects.

SUMMARY

The present invention addresses the above-mentioned problems by providing methods and nodes ensuring redundancy by establishing parallel independent network paths over layer 3 networks.

The objective is according to an aspect achieved by a source node for establishing independent network paths in a communication system comprising at least a first router node and a second router node, each connected to the source node over a first network and a second network, wherein the first and the second networks are mutually independent. The source node comprises a first interface towards the first network, wherein the first network and the first interface are associated with a path identifier for a first network path, and a second interface towards a second network, wherein the second network and the second interface are associated with a path identifier for a second network path. The source node is configured to select which of the first and second router nodes should be used for sending data from the source node to the destination node via the first network path and which of the first and second router nodes should be used for sending data to the destination node via the second network path, wherein the source node is configured to select different router nodes for the first and second network paths.

The method enables an application of the source node to send duplicate data using different network paths to distant destination nodes. By the network paths being independent, i.e. not having any network links in common, there is no single point of failure and a high reliability of data being duly delivered is provided. The network paths are available simultaneously, which ensures availability even if one of the local area networks would fail and require reconfiguration. The method provides improved network availability, which is highly important and required in e.g. large process automation plants.

The objective is according to an aspect achieved by a method in a source node for establishing independent network paths in a communication system, comprising at least a first router node and a second router node, each connected to the source node over a first network and a second network, wherein the first and the second networks are mutually independent. The source node comprises a first interface towards the first network, wherein the first network and the first interface are associated with a path identifier for a first network path, and a second interface towards a second network, wherein the second network and the second interface are associated with a path identifier for a second network path. The method comprises selecting which of the first and second router nodes should be used for sending data from the source to the destination node via the first network path and which of the first and second router nodes should be used for sending data to the destination node via the second network path, wherein the source node is configured to select different router nodes for the first and second network paths.

The objective is according to an aspect achieved by a computer program for a source node for establishing independent network paths in a communication system. The computer program comprises computer program code, which, when executed on at least one processor on the source node causes the source node to perform the method as above.

The objective is according to an aspect achieved by a computer program product comprising a computer program as above and a computer readable means on which the computer program is stored.

The objective is according to an aspect achieved by a router node for enabling independent network paths in a communication system. The communication system comprises at least a first network, a second network, a third network and a fourth network, wherein the first, second, third and fourth networks are mutually independent. The router node comprises: a first interface towards the first network, wherein the first network and the first interface are associated with a path identifier for a first network path; a second interface towards the second network, wherein the second network and the second interface are associated with a path identifier for a second network path; a third interface towards the third network, wherein the third network and the third interface are associated with a path identifier for the first network path; a fourth interface towards the fourth network, wherein the fourth network and the fourth interface are associated with a path identifier for the second network path. The router node is configured to transmit, to all nodes within the communication system: a unique node identifier assigned to the router node, and network information, the network information comprising one or more of: information about one or more of the networks, information about nodes within the communication system, information on which networks and nodes within the communication system that are reachable using the router node by using the first and second network paths, respectively.

The objective is according to an aspect achieved by a method performed in a router node for enabling independent network paths in a communication system comprising at least a first network, a second network, a third network and a fourth network, wherein the first, second, third and fourth networks are mutually independent. The router node comprises: a first interface towards the first network, wherein the first network and the first interface are associated with a path identifier for a first network path; a second interface towards the second network, wherein the second network and the second interface are associated with a path identifier for a second network path; a third interface towards the third network, wherein the third network and the third interface are associated with a path identifier for the first network path; a fourth interface towards the fourth network, wherein the fourth network and the fourth interface are associated with a path identifier for the second network path. The method comprises transmitting, to all nodes within the communication system: a unique node identifier assigned to the router node, and network information, the network information comprising one or more of: information about one or more of the networks, information about nodes within the communication system, information on which networks and nodes within the communication system that are reachable using the router node by using the first and second network paths, respectively.

The objective is according to an aspect achieved by a computer program for a router node for enabling independent network paths in a communication system. The computer program comprises computer program code, which, when executed on at least one processor on the source node causes the source node to perform the method as above.

The objective is according to an aspect achieved by a computer program product comprising a computer program as above and a computer readable means on which the computer program is stored.

The objective is according to an aspect achieved by a communication system for establishing independent network paths. The communications system comprises at least a first and a second router node and a source node, according to the above. A method in a communication system is also provided.

Further features and advantages of the embodiments of the present invention will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

For sake of completeness and in order to provide thorough understanding of the present invention, a few aspects of communication networks are initially briefly described.

The Internet protocol suite, also denoted Transmission Control Protocol/Internet Protocol (TCP/IP) protocol stack, comprises a number of layers. For the sake of clarity, it may be noted that the Internet protocol suite does not correspond directly to the Open Systems Interconnection (OSI) model, e.g. since TCP/IP may not use certain OSI layers at all or may combine several OSI layers into a single layer. In the TCP/IP protocol stack hence:

Layer 1 is the physical network, e.g. Ethernet. Layer 1 specifies, for instance, physical characteristics of the communication media, such as hardware standards.

Layer 2 is the data link layer, defining a local communication link between two entities of the local network. The local network may e.g. be an Ethernet network, and an example of protocols used in the data link layer is thus Ethernet-related Institute of Electrical and Electronics Engineers (IEEE) protocols. The two entities within the local network communicate over e.g. Ethernet without any intervening routers.

Ethernet is used throughout this description as an example of Layer 1 and layer 2 implementation, but it is noted that other local area networks and corresponding protocols could be used, e.g. wireless local area networks such as e.g. Wi-Fi and that the invention is not limited to Ethernet as the local area networks.

Layer 3 is the network layer, also known as the Internet layer using e.g. Internet Protocol (IP). The Internet layer accepts and delivers packets for the Ethernet network across different networks, i.e. establishes inter-networking. The Internet layer thus involves routers, and a first IP router of a first Ethernet may for instance route packets to a second IP router of a second Ethernet on their way to their end destination. It is noted that a layer 3 segment in an IP network is sometimes also denoted a subnetwork. Such a subnetwork is formed by all nodes sharing the same network prefix as defined by its network mask. These nodes can then communicate directly on the layer 2 level (e.g. Ethernet).

Layer 4 is the transport layer, using e.g. TCP or User Datagram Protocol (UDP). The transport layer provides end-to-end communication and ensures that packets arrive in sequence by acknowledging packet reception and retransmitting lost packets.

The present invention is mostly concerned with and related to Layer 3, the Internet layer.

As indicated above, a router node is a device configured to forward data packets between communication networks, and the router is hence connected to two (or more) different networks. This is in contrast to a switch node, which is configured to interconnect multiple network segments at the data link layer. The router node reads address information in an incoming data packet to determine its end destination. The router node directs the data packet to its next-hop node in the path towards the end destination node by using information in a routing table or routing policy.

An end node, also denoted source node, as used herein denotes a communication endpoint, i.e. a node initiating communication (data packets) or being the end destination node (also denoted destination node herein) that receives the communication (data packets). The source node may also be a destination node, and a router node may also be a source node or destination node.

Figure 1:
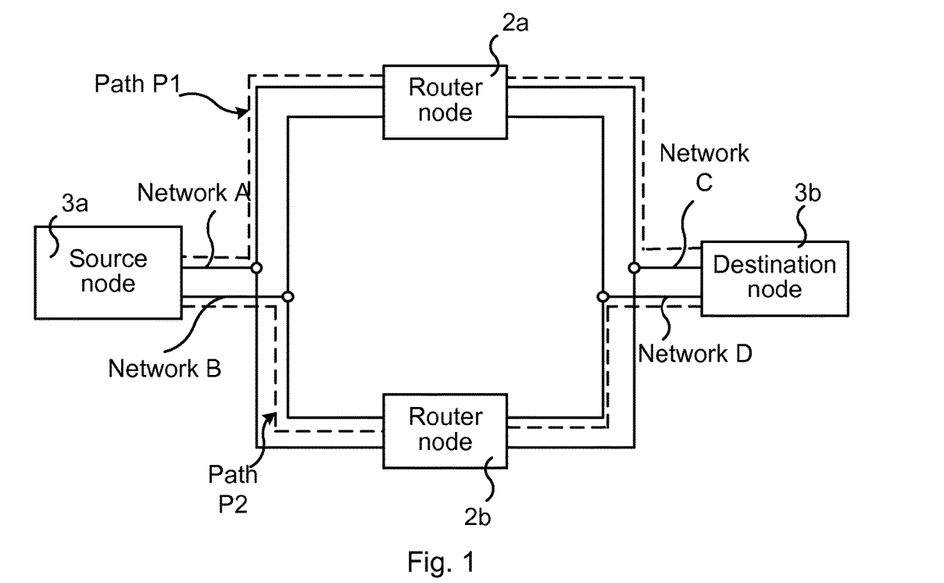
FIG. 1 illustrates schematically an environment in which embodiments according to the present invention may be implemented.

FIG. 1 illustrates an environment in which embodiments of the present invention may be implemented. A communication system 1 is illustrated, in particular a data communications system. The communication system 1 comprises at least two router nodes 2a, 2b (a first router node 2a and a second router node 2b) and two communicating end nodes 3a, 3b (a first end node 3a and a second end node 3b). The router nodes 2a, 2b are Layer 3 router nodes, i.e. configured to convey data packets between different communication networks.

According to an aspect of the invention, each router node 2a, 2b is connected to at least four parallel local area networks A, B, C, D, e.g. Ethernet networks. Conversely, the four or more independent networks A, B, C, D are interconnected by at least two router nodes 2a, 2b. The networks A, B, C, D are here denoted parallel and this should be understood as the networks A, B, C, D being completely separated, i.e. disjoint and operated in parallel. The end nodes 3a, 3b are dual attached nodes, i.e. each end node 3a, 3b is connected to two or more networks and may hence be seen as PRP-enabled nodes, which may send two copies of a frame (data packet), over each respective network port (e.g. Ethernet ports in case of the network being an Ethernet network). It is noted that each network A, B, C, D may comprise any number of connected network nodes and devices (as illustrated in FIG. 2).

The first end node 3a is in the following denoted source node 3a and the second end node 3b is denoted destination node 3b, although it is realized that the communication may be in the reverse direction as well (from the second end node 3b to the first end node 3a). Each of the source and destination nodes 3a, 3b is connected to the first and second router nodes 2a, 2b over at least at least two independent networks, e.g. Ethernets or other types of local area networks. In the example illustrated in FIG. 1, the source node 3a is connected to both the first and the second router nodes 2a, 2b over both a first network A and second network B. The source node 3a may hence send data to the destination node 3b via the first router node 2a over either the first network A or the second network B or via the second router node 2b over either the first network A or the second network B. Correspondingly, the destination node 3b is connected to both the first and the second router nodes 2a, 2b over a third network C and a fourth network D. The destination node 3b may hence receive data from the source node 3a via the first router node 2a over either the third network C or the fourth network D or via the second router node 2b over either the third network C or the fourth network D.

As a particular example, the source node 3a may be a device in a process automation system, such as e.g. a power plant. The source node 3a may for instance be configured to send data such as process data, control data, process control data, etc. An application of the source node 3a may be configured for such sending of data. The data is often time critical and is sent to the destination node 3b, which may, for instance, be a device of a remotely located control and maintenance center or a server of an external packet data network.

Figure 2:
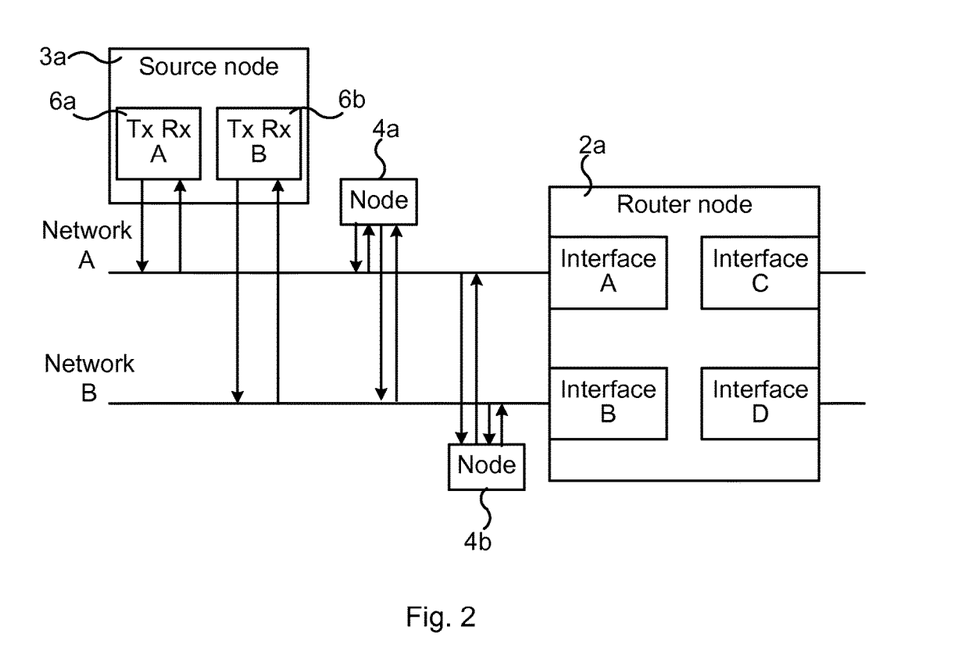
FIG. 2 illustrates part of a communication system in which embodiments according to the present invention may be implemented.

FIG. 2 illustrates the source node 3a being connected to the first router node 2a and the second router node 2b over two networks: the first network A and the second network B. To this end, the source node 3a may comprise two network interfaces 6a, 6b (e.g. Ethernet interface comprising connectors, e.g. Ethernet ports) for the respective cabling, comprising e.g. Category 5 (Cat 5) cables, of the networks A, B. The destination node 3b may correspondingly comprise two network interfaces (not illustrated).

It is realized that the communication system 1 may comprise numerous networks and network nodes besides the networks and nodes illustrated in FIG. 1. In FIG. 2 the first network A is illustrated as having connected thereto the source node 3a and the router node 2a and also yet an additional node 4a. The second network B is illustrated as having connected thereto the source node 3a and the router node 2a and also another additional node 4b. These additional nodes 4a and 4b, respectively, may comprise any type of device, e.g. switches, hubs, actuators, sensors, any device of e.g. an automation system, etc. Each such node may be connected to the first and the second router nodes 2a, 2b, possibly via other nodes depending on the type of local area network used. The first network A and the second network B are, as mentioned earlier, independent and any node of the first network A failing does not affect the data delivery over the second network B. If using different local area networks, e.g. a first local area network comprising Ethernet and a second local area network comprising Wi-Fi, these should also be independent (i.e. disjoint and operated in parallel).

In a corresponding manner as has been described for the source node 3a, the destination node 3b is also connected to the first and second router nodes 2a, 2b over at least two local area networks, e.g. Ethernets: a third network C and a fourth network D.

It is noted that the network links between the nodes 2a, 2b, 3a, 3b may be wired or wireless. It is also noted that FIG. 1 illustrates a minimum scenario in the sense that at least two communicating nodes are needed, and at least two router nodes (layer 3 routers) for routing data between the two communicating nodes 3a, 3b according to the invention. However, a larger number of nodes may be used, as described with reference to FIG. 2, and this is indeed the case in larger systems.

The communication system 1 may hence comprise still further router nodes interconnecting different independent layer 2 networks. As a particular example, the communication system 1 may comprise a fifth network and a sixth network (not illustrated) comprising a third router node and a fourth router node (not illustrated), each of the third and fourth router nodes, for instance, interconnecting the third network C and the fourth network D to a destination node over the fifth and sixth network. Such third and fourth router nodes would then provide the first and second router nodes 2a, 2b with further possibilities to reach desired destination nodes.

According to aspects of the present invention, a method is provided for establishing two parallel independent network paths through the communication system 1. With reference again to FIG. 1, a network path from the source node 3a to the destination node 3b may pass through the first router node 2a over either the first network A or over the second network B, and then over either the third network C or the fourth network D. A network path from the source node 3a to the destination node 3b may also pass through the second router node 2b over either the first network A or over the second network B, and then over either the third network C or the fourth network D.

In FIG. 1, a first network path P1 passes over the first network A to the first router node 2a and then over the third network C to the destination node 3b. A second network path P2 passes over the second network B to the second router node 2b and then over the fourth network D to the destination node 3b. The first and second network paths P1, P2 thus comprises (only) different network links and in particular also passes different router nodes 2a, 2b. By not following the same network links and not passing the same router nodes 2a, 2b there are no single points of failure, i.e. no single node or link that could stop the entire system from working. Thus, if for instance the third network C encounters a failure there is still a functioning network path over the fourth network D. As another example, if the first router node 2a fails, then there are still functioning network paths through the second router node 2b.

There are several possible paths between the source node 3a and the destination node 3b. According to the present invention, it is ensured that different router nodes 2a, 2b are used, giving two independent network paths over routed parallel networks simultaneously between the communicating source and destination nodes 3a, 3b. For instance, the first router node 2a may provide a first network path P1 (source node 3a→network A→router node 2a→network C→destination node 3b) and the second router node 2b may provide a second network path P2 (source node 3b→network B→router node 2b→network D→destination node 3b). The first and second network paths P1, P2 are independent by using different router nodes 2a, 2b and different, mutually independent networks A, B, C, D.

By using two layer 3 router nodes 2a, 2b as described a layer 3 redundancy is provided. When the source node 3a sets up a first and second independent network path P1, P2 through the communication system 1 it is performed in such way that the first and second network paths P1, P2 goes over different networks (e.g. Ethernets) as well as through different router nodes 2a, 2b.

The present invention thus ensures that the source node 3a always uses two independent network paths P1, P2 by selecting different router nodes 2a, 2b for the network paths. To this end, the source node 3a comprises a first interface towards the first network A. The first network A and a first interface to this first network A are associated with a path identifier for a first network path P1. The source node 3a also comprises a second interface towards a second network B. The second network B and the second interface to this second network B are associated with a path identifier for a second network path P2. The source node 3a may, at setting up of the layer 2 networks A, B (e.g. Ethernets), be provided with these first and second interfaces (e.g. Ethernet interfaces) towards the first and second networks A, B, and this is typically then used onwards. From this it is realized that the first network A is always (if not reconfigured) used for the first network path P1 and that the second network B is always used for the second network path P2. However, it needs to be ensured that the network paths P1, P2 use different router nodes 2a, 2b.

The source node 3a is therefore configured to select which of the first and second router nodes 2a, 2b it should use for sending data to the destination node 3b via the first network path P1 and which of the first and second router nodes 2a, 2b it should use for sending data to the destination node 3b via the second network path P2. The selection has to be such that different router nodes 2a, 2b are selected for the first and second network paths P1, P2.

Each router node 2a, 2b sends "Network information" on all connected networks A, B, C, D to all neighbor nodes. In the communication system 1 illustrated in FIG. 1, each router node 2a, 2b would send the "Network information" to the source node 3a and the destination node 3b.

The "Network information" may comprise information about all networks and nodes reachable through this router node 2a, 2b on network paths, e.g. "P1" or "P2" path. Based on this, the source node 3a may update a routing table and make the selection as required.

In particular, nodes 3a, 3b receiving the "Network information" may update their local IP routing table and network status information for the network paths, e.g. paths P1 and P2. For instance, the first router node 2a may be aware of a failure in the third network C, and "Network information" may be sent informing about this, upon which the source node 3a and the destination node 3b may need to update their respective IP routing table. Other examples of "Network information" comprise congestion information, link failures, node failures, distance to nodes, central processing unit (CPU) load, network load etc.

An application of e.g. the source node 3a may use the parallel network paths to send duplicate data to a remote receiving node, e.g. destination node 3b. The application may obtain information about in which network (e.g. network D) the destination node 3a resides. The address of the destination node 3b may, for instance, be known beforehand by the application or it may be acquired by the application from the source node 3a (within which the application resides and is run). The source node 3a in turn may have received the destination node 3b address from the "Network information" information. It is noted that the application may acquire the destination node 3b address in other ways as well. An application in the destination node 3b may filter out the data which is duplicate in any conventional manner.

According to embodiments of the present invention, all nodes 2a, 2b, 3a, 3b are given unique node identities. The IP address of a node is commonly used by routing protocols for identifying a node, but the node identifier according to the present invention makes it possible to identify a node in the network independently of its IP address. The unique node identifier is used in order to avoid parallel network paths to use the same router node. As mentioned earlier, by using different router nodes for the different network paths, the network paths are ensured to be independent. Each node 2a, 2b, 3a, 3b may also be configured with the conventional IP addresses for identification, e.g. one IP address for each network to which it is connected.

The end nodes of the communication system 1, e.g. the source node 3a, comprises and maintains routing tables for selecting a particular router node 2a, 2b for a particular network path P1, P2 in order to ensure that the network paths are independent. The network path P1, P2 are independent in the sense that they do not follow the same network links and do not pass the same router nodes 2a, 2b. The independent paths P1, P2 thereby have no single points of failure. Hence, there are no single points of failure that could prevent data communication between the source node 3a and the destination node 3b. In contrast to prior art, the present invention provides a solution that is suitable for highly time-critical applications. For instance, in a prior art solution wherein redundancy is provided e.g. by a back-up node, a re-configuration would be required for the replacement of the failed node with the back-up node. For highly time-critical applications this is not a conceivable solution.

The end nodes 3a, 3b, may, for the purpose of the present invention, comprise a routing protocol configured to establish the at least two independent paths. Such routing protocol may select a path using an IP routing table as below:

Example on path selection using IP Routing table:

TABLE 1

|  | Network Destination | IP Network mask (netmask) | Gateway (IP router) |
|---|---|---|---|
| 1$^{st}$ path P1: | Network C | C netmask (e.g. 255.255.255.0) | Address of 1$^{st}$ router (e.g. 10.6.0.1) |
| 2$^{nd}$ path P2: | Network D | D netmask (e.g. 255.255.255.0) | Address of 2$^{nd}$ router (e.g. 10.6.59.1) |

Network Destination may be the IP address of the packet's final destination (i.e. IP address of the destination node 3b) or, as illustrated, a particular local area network of the destination node 3b.

IP Network mask (also denoted netmask) may be a subnet mask for a particular IP address, used by the router node 2a, 2b to resolve which part of the IP address provides the network address (e.g. Network C) and which part of the address provides a node address (e.g. address of the destination node 3a). All nodes in e.g. the third network C have the same network prefix, while the nodes have, according to the present invention, unique node identifiers.

From the routing table, information may be obtained on which gateway (which router node) the source node 3a should use for the respective network paths P1, P2. The routing table indicates (in the column "Gateway") that the first path P1 should use the first router node 2a and that the second path P2 should use the second router node 2b.

In order to ensure that the first path P1 and the second path P2 use different router nodes 2a, 2b, the source node 3a may select the first router node 3a for the first path P1 (over the first network A) based on that the first router node 3a has the lowest node identifier (e.g. lowest IP address, as exemplified in Table 1), while the second router node 3b is selected for the second path P2 (over the second network B) based on the second router node 3b having the highest node identifier (e.g. highest IP address). Various other ways of identifying different router nodes for the different paths P1, P2 to use different router nodes are conceivable. For instance, the unique node identifier may comprise a network unique name, a Globally unique identifier (GUID) or a Media Access Control (MAC) address. Although the IP addresses may be used as router node identifiers, the use of e.g. GUID, MAC address or a network unique name is preferred over IP addresses since the latter may be different depending on the network from which the router node is accessed.

As mentioned earlier, the nodes receiving the "Network information" may update their local IP routing table and network status information for network paths, e.g. paths P1 and P2. Thereby the proper router node 2a, 2b is always selected for a certain network path, and the desired at least two independent network paths P1, P2 between the source node 3a and the destination node 3b are hence obtained.

It is noted that the routing table above is provided purely as an illustrative example, and that the routing table may comprise additional or fewer parameters. For instance, the routing table may comprise information such as: Interface; which is the outgoing network interface that the end node 3a should use when forwarding the packet to the next hop or final destination; Next hop, which is the IP address of the next node on the path to the destination node 3b and to which the packet is forwarded; Routes, which identifies directly-attached networks (A, B), and also identifies indirect networks (C, D) to which the end node 3a is not directly connected, but can access through either of the first or second router nodes 2a, 2b; Metric, which may provide capacity, distance, transmission delay etc. for each available network path. The metric may be helpful when the network paths are selected. The network paths for the same destination have equal capacity, distance and transmission delay.

In various embodiments, all nodes 2a, 2b, 3a, 3b may send "Supervision information" on all connected networks to all neighbor nodes. The "Supervision information" sent by a node may, for instance, comprise one or more of: its own node identity, its own IP address, a network Id "A" or "B" (or "C" or "D"). As has been noted earlier, the communication system 1 may comprise any number of nodes, and each such node may then send the "Supervision information" to their respective neighbor nodes.

An interface may also be provided, which may be implemented in one or more nodes 2a, 2b, 3a, 3b or e.g. a workstation of the communication system 1 in order to enable supervision of network paths to all reachable nodes. The "Supervision information" and "Network information" may be used as input and e.g. illustrative graphics may be provided by means of the interface, thereby enabling maintenance and/or supervising personnel to easily see any problems (e.g. link failures) that might arise.

The various features and embodiments that have been described may be combined in many different ways, examples of which are given in the following with reference to FIG. 3.

Figure 3:
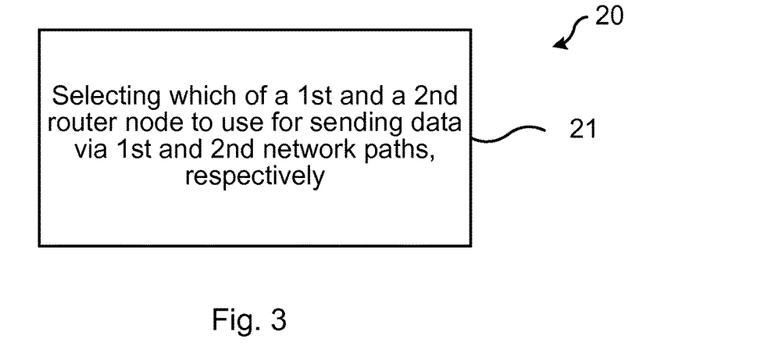
FIG. 3 illustrates a flow chart over steps of a method in a source node in accordance with the present invention.

FIG. 3 illustrates a flow chart over steps of a method in a network device in accordance with the present invention.

A method 20 is provided for establishing independent network paths P1, P2 in a communications system 1. The communications system 1 comprises at least a first router node 2a and a second router node 2b, each connected to the source node 3a over a first network A and a second network B, wherein the first and the second networks A, B are mutually independent. The method 20 may be performed in a sending end node 3a (source node 3a) for sending data to a receiving end node 3b (destination node 3b).

The source node 3a comprises a first interface towards the first network A, wherein the first network A and the first interface are associated with a path identifier for a first network path P1.

The source node 3a comprises a second interface towards a second network B, wherein the second network B and the second interface are associated with a path identifier for a second network path P2.

The method 20 comprises selecting 21 which of the first and second router nodes 2a, 2b should be used for sending data from the source node 3a to the destination node 3b via the first network path P1 and which of the first and second router nodes 2a, 2b) should be used for sending data to the destination node 3b via the second network path P2, wherein the source node 3a is configured to select different router nodes 2a, 2b for the first and second network paths P1, P2.

The method 20 ensures that all network links of the first network path P1 differs from the network links of the second network path P2. The network paths P1, P2 are independent by using different network links and different router nodes 2a, 2b (in particular layer-3 router nodes 2a, 2b). The method 20 enables two paths that are active simultaneously. The source node 3a, 3b may find at least two parallel paths at the same time, which is highly valuable especially in large networks within which error sensitive and/or loss sensitive data is sent. The network paths P1, P2 are independent in the sense that they use different network links and different router nodes 2a, 2b, wherein the network paths P1, P2 have no network link or node in common.

In an embodiment, the selecting 21 comprises setting up a routing table comprising routing information for sending data to the destination node 3b reachable via the first and the second router nodes 2a, 2b, wherein the routing information specifies which of the first and second router nodes 2a, 2b should be selected for sending data to the destination node 3b via the first network path P1 and which of the first and second router nodes 2a, 2b should be selected for sending data to the destination node 3b via the second network path P2, wherein the routing information defines different router nodes 2a, 2b for the first and second network paths P1, P2.

In some embodiments, the source node 3a is assigned a unique node identifier and the method 20 comprises exchanging supervision information on the first and the second networks A, B respectively with all neighbor nodes 2a, 2b, which supervision information comprises one or more of: the unique node identifier, information on addresses associated with the first and second interfaces respectively, and information on network identities associated with the first and second networks A, B. By exchanging supervision information between the nodes, supervision of the communication system is enabled. The supervision information may, for instance, be used as input to graphically illustrating network paths and possible problems related thereto.

In various embodiments, the unique node identifier comprises one of: a network unique name, a Globally unique identifier (GUID) or a Media Access Control (MAC) address. The selected network paths P1, P2 to the destination node 3b may comprise establishing network paths P1, P2 having equal capacity, equal distance and/or equal transmission delay. By establishing that the network paths have equal capacity and/or equal distance and/or equal transmission delay, an error occurring on either network path will not affect the performance from the viewpoint of the application that is sending/receiving data.

In various embodiments, the first and second router nodes 2a, 2b are associated with unique node identifiers respectively and the method 20 comprises selecting the router node 2a, 2b having the lowest unique node identifier as the router node for sending data to the destination node 3b via the first network path P1 and the router node 2a, 2b having the highest unique node identifier as the router node for sending data to the destination node 3b via the second network path P2.

In various embodiments, the method 20 comprises receiving network information from one or both of the first router node 2a and the second router node 2b and/or a neighboring node 4a and updating the routing table with the network information.

In variations of the above embodiment, the network information comprises one or more of: information about one or more of the networks A, B, C, D, information about nodes within the communications system 1, information on which networks A, B, C, D and/or nodes within the communications system 1 that are reachable using the first router node 2a and information on which networks A, B, C, D and/or nodes within the communications system 1 that are reachable using the second router node 2b.

In various embodiments, the method 20 comprises replicating data to be sent to the destination node 3b and sending the data in parallel over the first network path P1 and the second network path P2 to the destination node 3.

In various embodiments, the first router node 2a and the second router node 2b comprise layer 3 routers.

Figure 4:
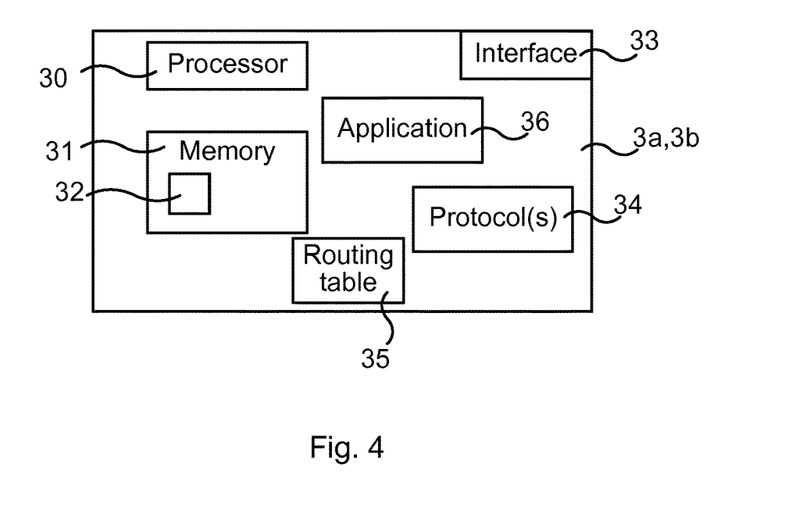
FIG. 4 illustrates schematically a source node and means for implementing embodiments of the present invention.

FIG. 4 illustrates schematically a source node 3a, 3b and means for implementing embodiments of the present invention.

The source node 3a, 3b comprises a processor 30 comprising any combination of one or more of a central processing unit (CPU), multiprocessor, microcontroller, digital signal processor (DSP), application specific integrated circuit etc. capable of executing software instructions stored in a memory 31 which can thus be a computer program product 31. The processor 30 can be configured to execute any of the various embodiments of the method for instance as described in relation to FIG. 3.

The memory 31 can be any combination of read and write memory (RAM) and read only memory (ROM), Flash memory, magnetic tape, Compact Disc (CD)-ROM, digital versatile disc (DVD), Blu-ray disc etc. The memory 31 may also comprise persistent storage, which, for example, can be any single one or combination of magnetic memory, optical memory, solid state memory or even remotely mounted memory.

The source node 3a, 3b also comprises an interface 33 for instance an input/output device for communicating with other network nodes. Such interface 33 may comprise a wireless communication interface and/or a wired communication interface (e.g. Ethernet). The source node 3a, 3b comprises in particular a first interface towards a first network A and a second network B, for instance Ethernet networks.

The source node 3a, 3b may thus also comprise one or more interfaces in the form of protocols e.g. IP protocols, Ethernet protocols etc., schematically indicated at reference numeral 34. Further, the source node 3a, 3b comprises a routing table 35, e.g. as described earlier.

The source node 3a, 3b may comprise an application 36 configured to send data to a destination node. Examples of such applications comprise for instance an IEC 61131 application communicating over the networks with several Input/Output (I/O) devices connected to a subnetwork.

The present invention provides computer programs 32 for the source node 3a, 3b. The computer program 32 comprises computer program code, which, when executed on at least one processor 30 of the source node 3a, 3b causes the source node 3a, 3b to perform the method 20 according to any of the described embodiments thereof.

The present invention also encompasses computer program products 31 comprising a computer program 32 for implementing the embodiments of the method as described, and a computer readable means on which the computer program 32 is stored. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

The invention provides a source node 3a for establishing independent network paths P1, P2 in a communication system 1 comprising at least a first router node 2a and a second router node 2b, each connected to the source node 3a over a first network A and a second network B, wherein the first and the second networks A, B are mutually independent. The source node 3a comprises a first interface towards the first network A, wherein the first network A and the first interface are associated with a path identifier for a first network path P1; and a second interface towards a second network B, wherein the second network B and the second interface are associated with a path identifier for a second network path P2.

The source node 3a is configured to select which of the first and second router nodes 2a, 2b should be used for sending data from the source node 3a to the destination node 3b via the first network path P1 and which of the first and second router nodes 2a, 2b should be used for sending data to the destination node 3b via the second network path P2, wherein the source node 3a is configured to select different router nodes 2a, 2b for the first and second network paths P1, P2.

The source node 3a may be configured to perform the above step e.g. by comprising one or more processors 30 and memory 31 the memory 31 containing instructions executable by the processor 30 whereby the end node 3a is operative to perform the step.

In different embodiments, the source node 3a is configured to perform the method 20 according to any of the described embodiments.

In an embodiment, the source node 3a is configured to select by being configured to set up a routing table comprising routing information for sending data to the destination node 3b reachable via the first and the second router nodes 2a, 2b. The routing information specifies which of the first and second router nodes 2a, 2b should be selected for sending data to the destination node 3b via the first network path P1 and which of the first and second router nodes 2a, 2b should be selected for sending data to the destination node 3b via the second network path P2. Further, the routing information defines different router nodes 2a, 2b for the first and second network paths P1, P2.

In an embodiment, the source node 3a is assigned a unique node identifier and configured to exchange supervision information over the first and the second networks A, B respectively with all neighbor nodes 2a, 2b. The supervision information comprises one or more of: the unique node identifier, information on addresses associated with the first and second interfaces respectively, and information on network identities associated with the first and second networks A, B.

In an embodiment, the first and second router nodes 2a, 2b are associated with unique node identifiers respectively and the source node is configured to select the router node 2a, 2b having the lowest unique node identifier as the router node for sending data to the destination node 3b via the first network path P1 and the router node 2a, 2b having the highest unique node identifier as the router node for sending data to the destination node 3b via the second network path P2.

In an embodiment, the source node 3a is configured to receive network information from one or both of the first router node 2a and the second router node 2b and/or a neighboring node 4a and updating the routing table with the network information.

In various embodiments, the network information comprises one or more of: information about one or more of the networks A, B, C, D, information about nodes within the communications system 1, information on which networks A, B, C, D and/or nodes within the communications system 1 that are reachable using the first router node 2a and information on which networks A, B, C, D and/or nodes within the communications system 1 that are reachable using the second router node 2b.

In an embodiment, the source node 3a is configured to replicate data to be sent to the destination node 3b and to send the data in parallel over the first network path P1 and the second network path P2 to the destination node 3b. The destination node 3b, e.g. an application thereon, may be configured to receive a first received data packet and discard the duplicate one received later.

Figure 5:
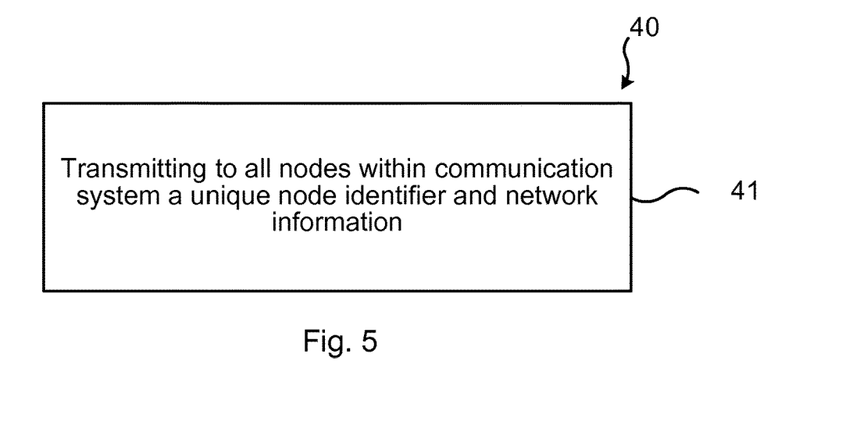
FIG. 5 illustrates a flow chart over steps of a method in a router node in accordance with the present invention.

FIG. 5 illustrates a flow chart over steps of a method in a router node in accordance with the present invention.

The method 40 may be performed in a router node 2a, 2b for enabling independent network paths P1, P2 in a communication system 1 comprising at least a first network A, a second network B, a third network C and a fourth network D, wherein the first, second, third and fourth networks A, B, C, D are mutually independent. The router node 2a, 2b comprises a first interface towards the first network A, wherein the first network A and the first interface are associated with a path identifier for a first network path P1.

The router node 2a, 2b comprises a second interface towards the second network B, wherein the second network B and the second interface are associated with a path identifier for a second network path P2.

The router node 2a, 2b comprises a third interface towards the third network C, wherein the third network C and the third interface are associated with a path identifier for the first network path P1.

The router node 2a, 2b comprises a fourth interface towards the fourth network D, wherein the fourth network D and the fourth interface are associated with a path identifier for the second network path P2.

The first, second, third and fourth interfaces may comprise any type of interface, comprising hardware and/or software, and providing wired or wireless communication over the respective networks.

The method 40 comprises:
transmitting 41, to all nodes 3a, 3b, 4a, 4b within the communication system 1:
a unique node identifier assigned to the router node 2a, and
network information, the network information comprising one or more of: information about one or more of the networks A, B, C, D, information about nodes within the communication system 1, information on which networks A, B, C, D and nodes within the communication system 1 that are reachable using the router node 2a, 2b by using the first and second network paths P1, P2, respectively. By transmitting, i.e. providing, its unique node identifier and network information to e.g. the source node 2a, the source node is enabled to establish two independent network paths P1, P2 to the destination node 3b based thereon.

In an embodiment, the router node 2a, 2b is assigned a unique node identifier and the method 40 comprises exchanging supervision information on the first, second, third and fourth networks A, B, C, D respectively with all neighbor nodes 2a, 2b, 3a, 3b, 4a, 4b) which supervision information comprises one or more of: the unique node identifier, information on addresses associated with the first, second, third and/or fourth interfaces respectively, and information on network identities associated with the first, second, third and/or fourth networks A, B, C, D.

In an embodiment, the method 40 comprises updating a database with network information and/or supervision information received from any node 3a, 3b, 4a, 4b within the communication system 1.

Figure 6:
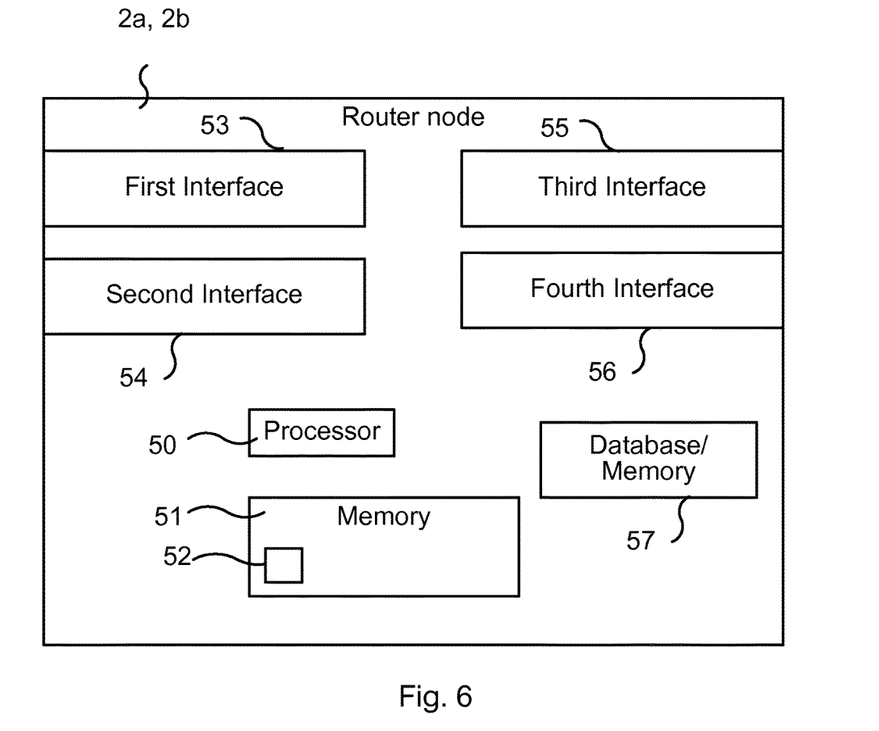
FIG. 6 illustrates schematically a router node and means for implementing embodiments of the present invention.

FIG. 6 illustrates schematically a router node and means for implementing embodiments of the present invention.

The router node 2a, 2b comprises a processor 50 comprising any combination of one or more of a central processing unit (CPU), multiprocessor, microcontroller, digital signal processor (DSP), application specific integrated circuit etc. capable of executing software instructions stored in a memory 31 which can thus be a computer program product 51. The processor 50 can be configured to execute any of the various embodiments of the method for instance as described in relation to FIG. 5.

The memory 51 can be any combination of read and write memory (RAM) and read only memory (ROM), Flash memory, magnetic tape, Compact Disc (CD)-ROM, digital versatile disc (DVD), Blu-ray disc etc. The memory 51 may also comprise persistent storage, which, for example, can be any single one or combination of magnetic memory, optical memory, solid state memory or even remotely mounted memory.

The router node 2a, 2b also comprises a number of interfaces, at least four interfaces. In the figure a first interface 53, a second interface 54, a third interface 55 and a fourth interface 56. The interfaces 53, 54, 55, 56 may comprise any type of interface, any combination of hardware and/or software adapted for communication with other network nodes. Such interfaces 53, 54, 55, 56 may comprise a wireless communication interface and/or a wired communication interface (e.g. Ethernet). The router node 2a, 2b comprises in particular a first interface towards a first network A, a second network B, a third network C and a fourth network D, for instance Ethernet networks. The router node 2a, 2b may thus also four or more interfaces in the form of protocols e.g. IP protocols, Ethernet protocols etc.

The router node 2a, 2b further comprise or has access to a data base or memory 57, for storing network information and/or supervision information.

The present invention provides computer programs 52 for the router node 2a, 2b. The computer program 52 comprises computer program code, which, when executed on at least one processor 50 of the router node 2a, 2b causes the router node 2a, 2b to perform the method 40 according to any of the described embodiments thereof.

The present invention also encompasses computer program products 51 comprising a computer program 52 for implementing the embodiments of the method as described e.g. in relation to FIG. 5, and a computer readable means on which the computer program 32 is stored. The computer program product 51 may, as mentioned earlier, be any combination of random access memory (RAM) or read only memory (ROM), Flash memory, magnetic tape, Compact Disc (CD)-ROM, digital versatile disc (DVD), Blu-ray disc etc.

A router node 2a, 2b for enabling independent network paths P1, P2 in a communication system 1 is provided. The communication system 1 comprises at least a first network A, a second network B, a third network C and a fourth network D, wherein the first, second, third and fourth networks A, B, C, D are mutually independent. The router node 2a, 2b comprises a first interface towards the first network A, wherein the first network A and the first interface are associated with a path identifier for a first network path P1,
a second interface towards the second network B, wherein the second network B and the second interface are associated with a path identifier for a second network path P2,
a third interface towards the third network C, wherein the third network C and the third interface are associated with a path identifier for the first network path P1,
a fourth interface towards the fourth network D, wherein the fourth network D and the fourth interface are associated with a path identifier for the second network path P2.

The router node 2a, 2b is configured to transmit, to all nodes 3a, 3b, 4a, 4b within the communication system 1:
a unique node identifier assigned to the router node 2a, and
network information, the network information comprising one or more of: information about one or more of the networks A, B, C, D, information about nodes within the communication system 1, information on which networks A, B, C, D and nodes within the communication system 1 that are reachable using the router node 2a, 2b by using the first and second network paths P1, P2, respectively.

In an embodiment, the router node 2a, 2b is assigned a unique node identifier and configured to exchange supervision information on the first, second, third and fourth networks A, B, C, D respectively with all neighbor nodes 2a, 2b, 3a, 3b, 4a, 4b. The supervision information comprises one or more of: the unique node identifier, information on addresses associated with the first, second, third and/or fourth interfaces respectively, and information on network identities associated with the first, second, third and/or fourth networks A, B, C, D.

In an embodiment, the router node 2a, 2b is configured to update a database with network information and/or supervision information received from any node 3a, 3b, 4a, 4b within the communication system 1.

It is noted that the method 20 in the source node 3a, described e.g. with reference to FIG. 3, and the method 40 in the router node 2a, 2b, described e.g. with reference to FIG. 5, may be performed in any of the nodes. That is, the router node may also act as source node as well as destination node, and the source node of some data may be the destination node for other data.

The present invention also comprises a communications system 1 as has been described. In particular, a communication system 1 for establishing independent network paths P1, P2 therein is provided. The communication system 1 comprises at least a first router node 2a and a second router node 2b, and at least a first network A, a second network B, a third network C and a fourth network D, wherein the first, second, third and fourth networks A, B, C, D are mutually independent. Each router node 2a, 2b comprises:
a first interface towards the first network A, wherein the first network A and the first interface are associated with a path identifier for a first network path P1,
a second interface towards a second network B, wherein the second network B and the second interface are associated with a path identifier for a second network path P2, and
a third interface towards the third network C, wherein the third network C and the third interface are associated with a path identifier for the first network path P1, a fourth interface towards the fourth network D, wherein the fourth network D and the fourth interface are associated with a path identifier for the second network path P2, and is configured to transmit, to all nodes 3a, 3b, 4a, 4b within the communication system 1:

a unique node identifier assigned to the router node 2a, and network information, the network information comprising one or more of: information about one or more of the networks A, B, C, D, information about nodes within the communication system 1, information on which networks A, B, C, D and nodes within the communication system 1 that are reachable using the router node 2a, 2b by using the first and second network paths P1, P2, respectively.

The description in relation to FIG. 6 on router nodes 2a, 2b is relevant also here and may be referred to.

The communication system 1 further comprises a source node 3a comprising:

a first interface towards the first network A, wherein the first network A and the first interface are associated with a path identifier for a first network path P1, a second interface towards the second network B, wherein the second network B and the second interface are associated with a path identifier for a second network path P2, and is configured to select which of the first and second router nodes 2a, 2b should be used for sending data from the source node 3a to the destination node 3b via the first network path P1 and which of the first and second router nodes 2a, 2b should be used for sending data to the destination node 3b via the second network path P2, wherein the source node 3a is configured to select different router nodes 2a, 2b for the first and second network paths P1, P2.

The description in relation to FIG. 4 on source nodes 3a, 3b is relevant also here and may be referred to. As mentioned earlier, the communication system 1 may comprise a larger number of independent networks, each comprising any number of nodes. For instance, the communication system 1 may comprise a fifth network, a sixth network, a seventh network and an eight network (not illustrated) interconnected through various router nodes. The first and second router nodes 2a, 2b then have further possibilities to reach a desired destination node.

Figure 7:
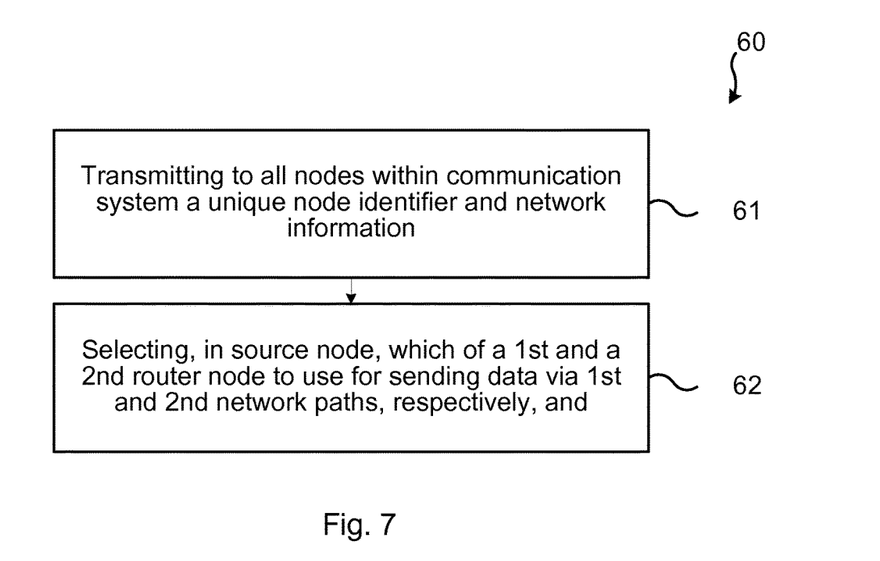
FIG. 7 illustrates a flow chart over steps of a method in a communication system in accordance with the present invention.

FIG. 7 illustrates a flow chart over steps of a method in a communication system 1 in accordance with the present invention.

A method 60 performed in a communication system 1 for establishing independent network paths P1, P2 therein, the communication system 1 comprising at least a first router node 2a and a second router node 2b, and at least a first network A, a second network B, a third network C and a fourth network D, wherein the first, second, third and fourth networks A, B, C, D are mutually independent. Each router node 2a, 2b comprises:

a first interface towards the first network A, wherein the first network A and the first interface are associated with a path identifier for a first network path P1, a second interface towards a second network B, wherein the second network B and the second interface are associated with a path identifier for a second network path P2, and a third interface towards the third network C, wherein the third network C and the third interface are associated with a path identifier for the first network path P1, a fourth interface towards the fourth network D, wherein the fourth network D and the fourth interface are associated with a path identifier for the second network path P2. The method 60 comprises transmitting (61), by each router node (2a, 2b) and to all nodes 3a, 3b, 4a, 4b within the communication system 1:

a unique node identifier assigned to the router node 2a, 2b, and network information, the network information comprising one or more of: information about one or more of the networks A, B, C, D, information about nodes within the communication system 1, information on which networks A, B, C, D and nodes within the communication system 1 that are reachable using the router node 2a, 2b by using the first and second network paths P1, P2, respectively, The communication system 1 further comprises a source node 3a comprising:

a first interface towards the first network A, wherein the first network A and the first interface are associated with a path identifier for a first network path P1, a second interface towards the second network B, wherein the second network B and the second interface are associated with a path identifier for a second network path P2. The method 60 comprises selecting 62, in the source node 3a, which of the first and second router nodes 2a, 2b should be used for sending data from the source node 3a to the destination node 3b via the first network path P1 and which of the first and second router nodes 2a, 2b should be used for sending data to the destination node 3b via the second network path P2, wherein the source node 3a is configured to select different router nodes 2a, 2b for the first and second network paths P1, P2.

The description on method 20 in source node in relation to FIG. 3, and on method in router node 40 in relation to FIG. 5 are relevant also here and may be referred to.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A source node configured to establish independent network paths for a network layer, layer 3, through a communication system, said communication system comprising at least a first network and a second network being layer 3 networks, wherein the source node:

comprises a first interface connecting to a first router node and to a second router node over the first network, wherein the first and second router nodes are layer 3 router nodes, and the first network and the first interface are associated with a path identifier for a first network path, comprises a second interface connecting to the first router node and the second router node over the second network, wherein the second network and the second interface are associated with a path identifier for a second network path, and wherein the first and second networks are mutually independent layer 3 networks, being disjoint and operated in parallel, is configured to select which of the first and the second router nodes should be used for sending data to a destination node via the first network path and which of the first and second router nodes should be used for sending data to the destination node via the second network path, wherein the source node is configured to select different router nodes for the first and second network paths.

2. The source node as claimed in claim 1, configured to select which of the first and the second router nodes should be used for sending data to the destination node via the first network path and which of the first and second router nodes should be used for sending data to the destination node via the second network path by using a routing table comprising routing information defining different router nodes for the first and second network paths.

3. The source node as claimed in claim 1, being assigned a unique node identifier and configured to exchange supervision information over the first and the second networks respectively with all neighbor nodes, which supervision information comprises one or more of: the unique node identifier, information on addresses associated with the first and second interfaces respectively, and information on network identities associated with the first and second networks.

4. The source node as claimed in claim 1, wherein the first and second router nodes are associated with unique node identifiers respectively and the source node is configured to select the router node having a lowest unique node identifier as the router node for sending data to the destination node via the first network path and to select the router node having a highest unique node identifier as the router node for sending data to the destination node via the second network path.

5. The source node as claimed in claim 1, configured to receive network information from one or both of the first router node and the second router node and/or another neighbor node and to update the routing table with the network information.

6. The source node as claimed in claim 5, wherein the network information comprises one or more of: information about one or more of the networks, information about nodes within the communications system, information on which networks and/or nodes within the communications system that are reachable using the first router node and information on which networks and/or nodes within the communications system that are reachable using the second router node.

7. The source node as claimed in claim 1, configured to replicate data to be sent in parallel over the first network path and the second network path to the destination node.

8. A method performed in a source node for establishing independent network paths for a network layer, layer 3, through a communication system, said communication system comprising at least a first network and a second network being layer 3 networks, the method comprising:
selecting different router nodes for a first and a second network paths by selecting which of a first router node and a second router node should be used for sending data from the source node to a destination node via a first network path, wherein the first network and a first interface of the source node are associated with a path identifier for the first network path, and which of the first and second router nodes should be used for sending data to the destination node via the second network path, wherein the second network and a second interface of the source node are associated with a path identifier for the second network path, and
wherein the first and second router nodes are layer 3 router nodes and the first and second networks are mutually independent layer 3 networks, being disjoint and operated in parallel.

9. The method as claimed in claim 8, wherein the selecting comprises setting up a routing table comprising routing information defining different router nodes for the first and second network paths and selecting which of the first and second router nodes should be selected for sending data to the destination node via the first network path and which of the first and second router nodes should be selected for sending data to the destination node via the second network path using the routing table.

10. The method as claimed in claim 8, wherein the source node is assigned a unique node identifier and the method comprises exchanging supervision information on the first and the second networks respectively with all neighbor nodes, which supervision information comprises one or more of: the unique node identifier, information on addresses associated with the first and second interfaces respectively, and information on network identities associated with the first and second networks.

11. The method as claimed in claim 8, wherein the first and second router nodes are associated with unique node identifiers respectively and wherein the method comprises selecting the router node having the lowest unique node identifier as the router node for sending data to the destination node via the first network path and the router node having the highest unique node identifier as the router node for sending data to the destination node via the second network path.

12. The method as claimed in claim 8, comprising receiving network information from one or both of the first router node and the second router node and/or another neighbor node and updating the routing table with the network information.

13. The method as claimed in claim 12, wherein the network information comprises one or more of: information about one or more of the networks, information about nodes within the communications system, information on which networks and/or nodes within the communications system that are reachable using the first router node and information on which networks and/or nodes within the communications system that are reachable using the second router node.

14. The method as claimed in claim 8, comprising replicating data to be sent in parallel over the first network path and the second network path to the destination node.

15. A non-transitory computer readable means comprising a computer program for a source node to establish independent network paths for a network layer, layer 3, through a communication system, said communication system comprising at least a first network and a second network being layer 3 networks, the computer program comprising computer program code, which, when executed on at least one processor on the source node causes the source node to perform the method according to claim 8.

16. A router node enabling a source node to establish independent network paths for a network layer, layer 3, through a communication system, said communication system comprising at least a first network, a second network, a third network and a fourth network being layer 3 networks, the router node being a layer 3 router node and comprising:
a first interface connecting to the first network, wherein the first network and the first interface are associated with a path identifier for a first network path,
a second interface connecting to the second network, wherein the second network and the second interface are associated with a path identifier for a second network path, a third interface connecting to the third network, wherein the third network and the third interface are associated with a path identifier for the first network path, a fourth interface connecting to the fourth network, wherein the fourth network and the fourth interface are associated with a path identifier for the second network path, wherein the first, second, third and fourth networks are mutually independent layer 3 networks, being disjoint and operated in parallel, and wherein the router node is configured to transmit, to all nodes within the communication system:

a unique node identifier assigned to the router node, and network information, the network information comprising one or more of: information about one or more of the networks, information about nodes within the communication system, information on which networks and nodes within the communication system that are reachable using the router node by using the first and second network paths, respectively.

17. The router node as claimed in claim 16, being assigned a unique node identifier and configured to exchange supervision information on the first, second, third and fourth networks respectively with all neighbor nodes, which supervision information comprises one or more of: the unique node identifier, information on addresses associated with the first, second, third and/or fourth interfaces respectively, and information on network identities associated with the first, second, third and/or fourth networks.

18. The router node as claimed in claim 17, configured to update a database with network information and/or supervision information received from any node within the communication system.

19. A method performed in a router node for enabling a source node to establish independent network paths for a network layer, layer 3, through a communication system, said communication system comprising at least a first network, a second network, a third network and a fourth network being layer 3 networks, the router node being a layer 3 router node, the method comprising:

transmitting, to all nodes within the communication system:

a unique node identifier assigned to the router node, and network information, the network information comprising one or more of: information about one or more of the first, second, third and fourth networks that are mutually independent layer 3 networks, being disjoint and operated in parallel, wherein the first and third mutually independent networks and a first and a third interface of the router node are associated with a path identifier for a first network path and the second and fourth mutually independent networks and a second and a fourth interface of the router node are associated with a path identifier for a second network path, information about nodes within the communication system, information on which networks, and nodes within the communication system that are reachable using the router node by using the first and second network paths, respectively.

20. The method as claimed in claim 19, wherein the router node is assigned a unique node identifier and the method comprises exchanging supervision information on the first, second, third and fourth networks respectively with all neighbor nodes, which supervision information comprises one or more of: the unique node identifier, information on addresses associated with the first, second, third and/or fourth interfaces respectively, and information on network identities associated with the first, second, third and/or fourth networks.

21. The method as claimed in claim 20, comprising updating a database with network information and/or supervision information received from any node within the communication system.

22. A non-transitory computer readable means comprising a computer program for a router node for enabling a source node to establish independent network paths for a network layer, layer 3, through a communication system, said communication system comprising at least a first network, a second network, a third network and a fourth network being layer 3 networks, where the router node is a layer 3 router node, the computer program comprising computer program code, which, when executed on at least one processor on the router node causes the router node to perform the method according to claim 19.

23. A communication system for enabling a source node to establish independent network paths for a network layer, layer 3 through the communication system, said communication system comprising at least a first router node and a second router node, and at least a first network, a second network, a third network and a fourth network, wherein the first, second, third and fourth networks are mutually independent layer 3 networks, being disjoint and operated in parallel, wherein each router node is a layer 3 router node and comprises:

a first interface connecting to the first network, wherein the first network and the first interface are associated with a path identifier for a first network path, a second interface connecting to the second network, wherein the second network and the second interface are associated with a path identifier for a second network path, and a third interface connecting to the third network, wherein the third network and the third interface are associated with a path identifier for the first network path, a fourth interface connecting to the fourth network, wherein the fourth network and the fourth interface are associated with a path identifier for the second network path, wherein each router node is configured to transmit, to all nodes within the communication system:

a unique node identifier assigned to the router node, and network information, the network information comprising one or more of: information about one or more of the networks, information about nodes within the communication system, information on which networks and nodes within the communication system that are reachable using the router node by using the first and second network paths, respectively, the communication system further comprising the source node comprising:

a first interface connecting to a first router node and to a second router node over the first network, wherein the first network and the first interface are associated with a path identifier for the first network path and the first and second router nodes are layer 3 router nodes, a second interface connecting to the first router node and the second router node over the second network, wherein the second network and the second interface are associated with a path identifier for a second network path, and wherein the first and second networks are mutually independent layer 3 networks, is configured to select which of the first and the second router nodes should be used for sending data to a destination node via the first network path and which of the first and second router nodes should be used for sending data to the destination node via the second network path, wherein the source node is configured to select different router nodes for the first and second network paths.

24. A method performed in a communication system for enabling a source node to establish independent network paths for a network layer, layer 3, through the communication system, said communication system comprising at least a first router node and a second router node, and at least a first network, a second network, a third network and a fourth network, wherein the first, second, third and fourth networks are, mutually independent layer 3 networks, being disjoint and operated in parallel, wherein each router node is a layer 3 router node and comprises:
- a first interface towards the first network, wherein the first network and the first interface are associated with a path identifier for a first network path,
- a second interface towards the second network, wherein the second network and the second interface are associated with a path identifier for a second network path, and
- a third interface towards the third network, wherein the third network and the third interface are associated with a path identifier for the first network path,
- a fourth interface towards the fourth network, wherein the fourth network and the fourth interface are associated with a path identifier for the second network path, and the method comprises
transmitting, by each router node and to all nodes within the communication system:
a unique node identifier assigned to the router node, and
network information, the network information comprising one or more of: information about one or more of the networks, information about nodes within the communication system, information on which networks and nodes within the communication system that are reachable using the router node by using the first and second network paths, respectively, the communication system further comprising the source node comprising:
a first interface towards the first network, wherein the first network and the first interface are associated with a path identifier for a first network path,
a second interface towards the second network, wherein the second network and the second interface are associated with a path identifier for a second network path, and the method comprises
selecting, in the source node, which of the first and second router nodes should be used for sending data from the source node to the destination node via the first network path and which of the first and second router nodes should be used for sending data to the destination node via the second network path, wherein the source node is configured to select different router nodes for the first and second network paths.

* * * * *